United States Patent [19]

Cook

[11] 4,350,104

[45] Sep. 21, 1982

[54] SEWING MACHINE MOTOR MOUNT

[75] Inventor: Albert N. Cook, Madison, N.J.

[73] Assignee: The Singer Company, Stamford, Conn.

[21] Appl. No.: 311,689

[22] Filed: Oct. 15, 1981

[51] Int. Cl.³ .................. D05B 69/02; D05B 69/12
[52] U.S. Cl. .............................. 112/220; 248/665; 248/666; 474/135
[58] Field of Search ............... 248/652, 655, 656, 665, 248/666; 310/91; 474/115, 133, 135, 136; 112/220, 217.1

[56] References Cited

U.S. PATENT DOCUMENTS

| | | |
|---|---|---|
| 3,041,023 | 6/1962 | Odlum et al. .................. 248/666 |
| 3,563,196 | 2/1971 | Nicolay . |
| 3,739,735 | 6/1973 | Herron et al. |
| 3,983,429 | 9/1976 | Allardice, Jr. .................. 310/91 |
| 4,240,368 | 12/1980 | Adams . |

FOREIGN PATENT DOCUMENTS 2819806 11/1979 Fed. Rep. of Germany ...... 112/220

Primary Examiner—Werner H. Schroeder
Assistant Examiner—Andrew M. Falik
Attorney, Agent, or Firm—William V. Ebs; Robert E. Smith; Edward L. Bell

[57] ABSTRACT

A sewing machine motor is provided with stamped out sheet metal end brackets including arms with disc like end portions which are mounted for pivotal movement in slots in a frame to permit the motor to be adjusted as required to alter tension in a belt driven by the motor.

9 Claims, 5 Drawing Figures

SEWING MACHINE MOTOR MOUNT

DESCRIPTION

FIELD OF THE INVENTION

The invention relates to mounting arrangements for electric motors in sewing machines.

BACKGROUND OF THE INVENTION

It is well known in the sewing machine art to pivotally mount a motor in the frame of a sewing machine, and to provide means for moving the motor about its pivotal axis to adjust the tension in a power transmitting belt driven by the motor. Such arrangements may be seen, for example, in U.S. Pat. No. 4,240,368 of Kenneth D. Adams for "Motorized Drive for a Sewing Machine Including Belt Tensioning Means" issued Dec. 23, 1980, and in U.S. Pat. No. 3,739,357 of William L. Herron for "Electric Motor Mount for Sewing Machines" issued June 19, 1973. However, the prior arrangements substantially added to the cost of a sewing machine because of the number of machined parts needed and the time required to mount the motor in the machine.

It is a prime object of the present invention to provide an improved inexpensive mounting arrangement for a motor in a sewing machine permitting the motor to be pivotally adjusted as required to change the tension in a power transmitting belt driven by the motor.

It is another object of the invention to provide an arrangement permitting a motor to be pivotally mounted in the frame of a sewing machine without the need for machined parts where the motor and frame are to pivotally connect.

Other objects and advantages of the invention will become apparent during a reading of the specification taken in connection with the accompanying drawings.

SUMMARY OF THE INVENTION

In accordance with the invention, an electric motor for use in driving a sewing machine is provided with end brackets which are bolted together and form a fixed part of the motor structure. The end brackets are sheet metal parts formed with arms which extend parallel to each other on the motor. Such arms include disc like end portions which are received for pivotal movement in slots formed in a frame extending over the motor. Means are provided for moving the end brackets and thereby the motor about a pivotal axis through the disc like end portions of the bracket arms in said slots to effect a tension adjustment in a power transmitting belt drivable by the motor.

DESCRIPTION OF THE PREFERRED EMBODIMENT OF THE INVENTION

Figure 1:
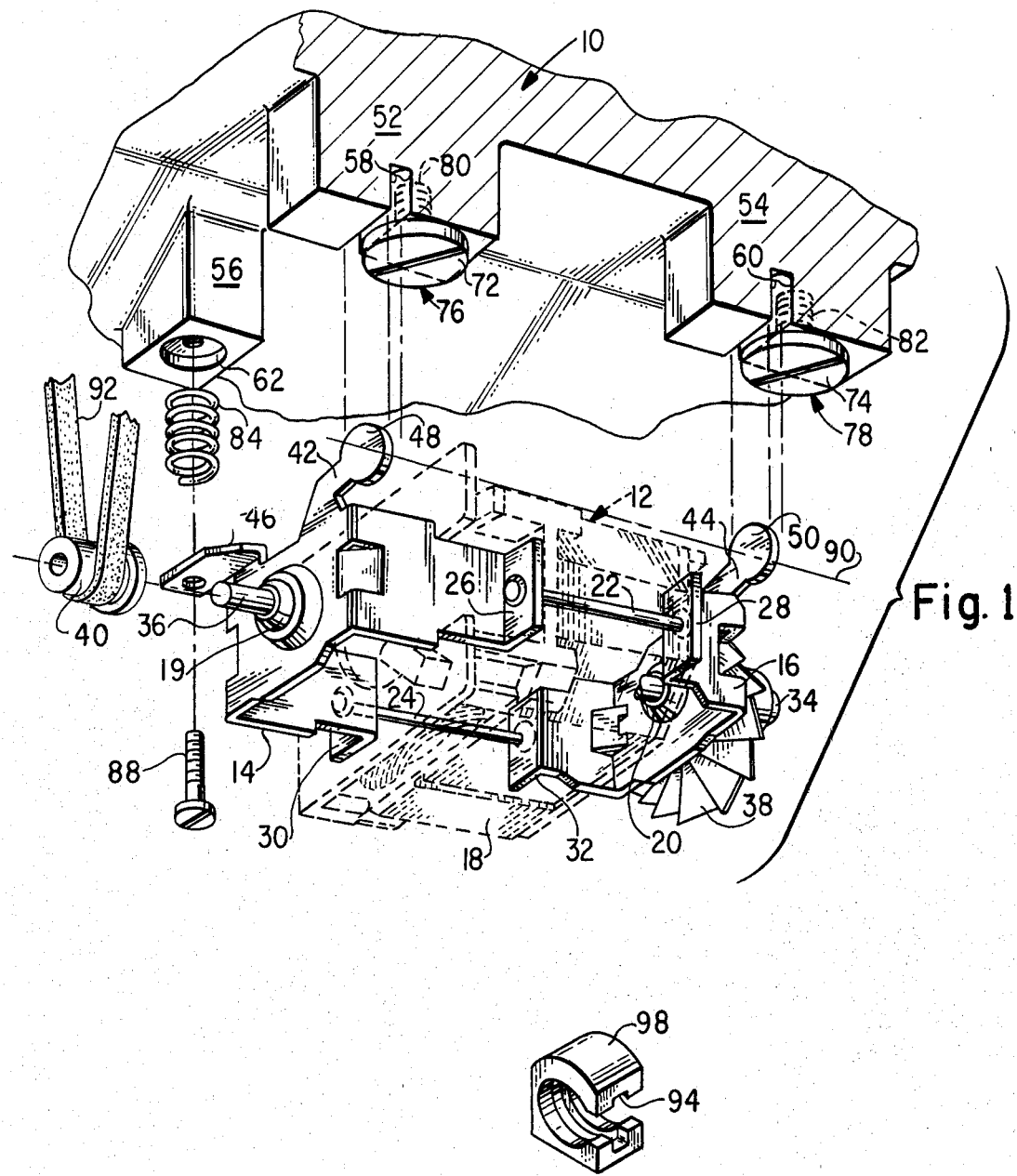
FIG. 1 is a fragmentary bottom partially disassembled perspective view showing the motor mounting arrangement of the invention.
Figure 2:
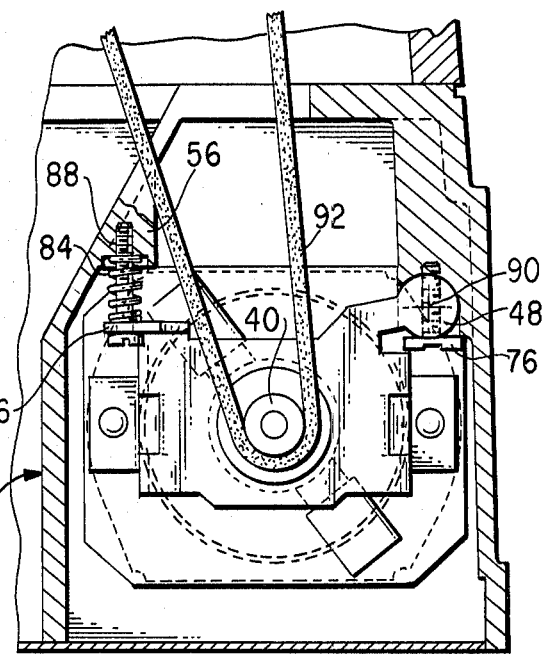
FIG. 2 is an end view of the motor mounting arrangement of FIG. 1 shown partially in section.

Referring to FIGS. 1 and 2 of the drawings, reference character 10 designates the frame of a sewing machine wherein a motor 12 may be supported as described herein. The motor includes stamped out sheet metal end brackets 14 and 16 which are clamped against the stator 18 of the motor by rivets 22 and 24 extending through the stator 18 and through flanges formed on the brackets. As shown, rivet 22 extends through flanges 26 and 28 on end brackets 14 and 16, and rivet 24 extends through flanges 30 and 32 on the said end brackets 14 and 16. The brackets 14 and 16 carry bearings 19 and 20 respectively, which support rotor shaft portions 34 and 36 as indicated. Rotor shaft portion 34 has a fan 38 fixedly mounted thereon, and rotor shaft portion 36 has a pulley 40 secured thereto.

Brackets 14 and 16 are formed with arms 42 and 44 which extend parallel to each other on the motor. One bracket 14 is also formed with a tab 46 which serves a purpose hereinafter described. Arm 42 is formed with a disc like circular end portion 48 and arm 44 is formed with a corresponding disc like circular end portion 50.

Sewing machine frame 10 is preferably molded or cast as a unitary structure with depending slotted bosses 52 and 54, and a depending recessed boss 56. Boss 52 includes a dead ended slot 58 and boss 54 includes a corresponding dead ended slot 60. Boss 56 includes recess 62. The location of slots 58 and 60 is such as to permit disc shaped circular end portions 48 and 50 of the bracket arms 42 and 44 to be brought into alignment with the slots.

Motor 12 is mounted in the frame 12 by first positioning arm end portions 48 and 50 in the slots 58 and 60 under slot overlapping portions of the heads 72 and 74 of loosened screws 76 and 78. The screws which are threaded into the bosses 52 and 54 at 80 and 82 as shown are then tightened against the bosses to lock the disc end portions of the bracket arms in slots 58 and 60. A coil spring 84 is positioned between tab 46 on bracket 14 and boss 56 for engagement at one end with tab 46 and at the other end with boss 56 in recess 62. A screw 88 is passed through the tab 46 and coil spring 84, and is threaded into the boss 56 to compress the spring.

Spring 84 biases the motor 12 in a counterclockwise direction as viewed in FIG. 2 about an axis 90 extending through the disc like end portions 48 and 50 of bracket arms 42 and 44, and thereby applies tension to a power transmitting belt 92 drivable by motor pulley 40 and operably connected with mechanism of the sewing machine. Tension in the belt 92 is increased by loosening screw 88 and is decreased by tightening the screw.

Figure 5:
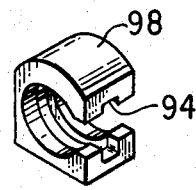
FIG. 5 is a perspective view of a grommet used in the modified motor mounting arrangement.
Figure 4:
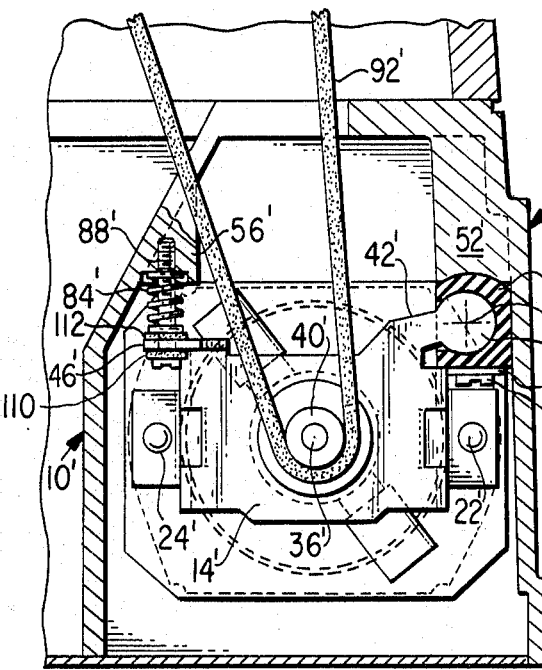
FIG. 4 is an end view of the motor mounting arrangement of FIG. 3 shown partially in section.
Figure 3:
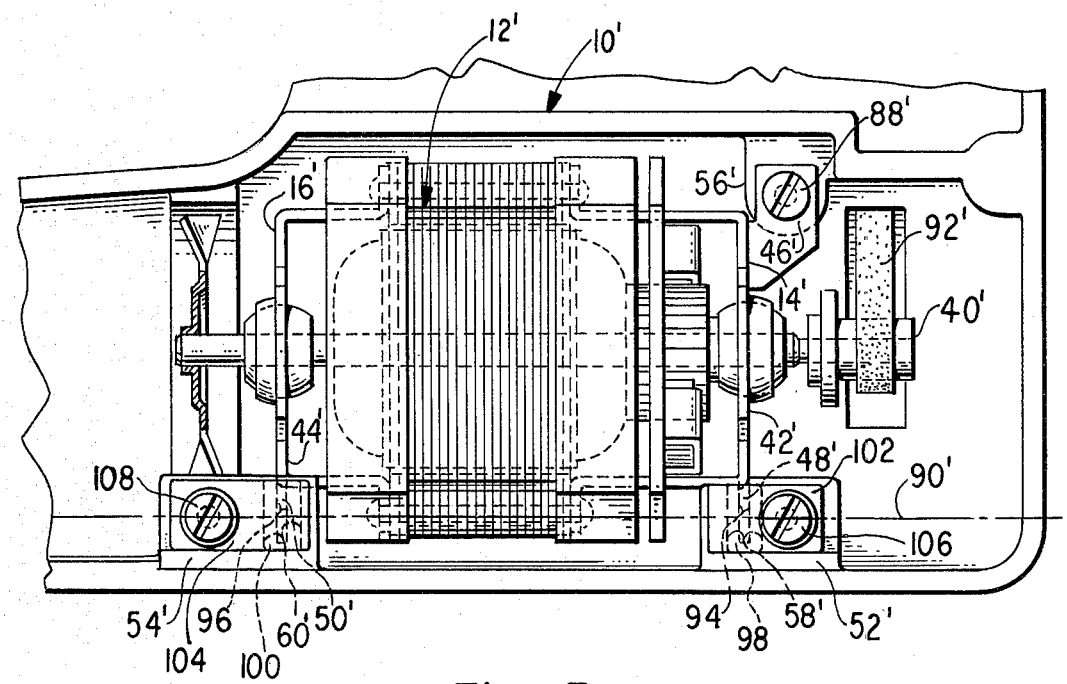
FIG. 3 is a fragmentary bottom view showing a modified motor mounting arrangement.

Referring to FIGS. 3 and 4, there may be seen an alternate form of the invention wherein parts corresponding to these already described are designated with like reference characters having a prime mark (') added thereto. The arrangement of FIGS. 3 and 4 is generally similar to that of FIGS. 1 and 2, in that end brackets 14' and 16' of a motor 12' are provided at the ends of arms 42' and 44' with disc like end portions 48' and 50' which are mounted for for movement about a pivotal axis 90' in slots 58' and 60' formed in bosses 52' and 54' in a sewing machine frame 10' extending over the motor. However, in the arrangement of FIGS. 3 and 4, the disc like end portions 48' and 50' on the bracket arms are fitted into slots 94 and 96 in resilient vibration and noise reducing grommets 98 and 100. The grommets 98 and 100 are received in widened slots 58' and 60' in bosses 52' and 54'. Plates 102 and 104 secured to the bosses with screws 106 and 108 extend over the boss slots and engage the grommets to lock the grommets and disc like end portions the bracket arms in the bosses. A screw 88' extending through a bracket tab 46', resilient cushioning washers 110 and 112 a spring 84' and into a boss 56' is provided for tightening and loosening a power transmission belt 92' on motor pulley 40'. The arrangement of FIGS. 3 and 4 with grommets for the disc like end portions 48' and 50' of the bracket arms and resilient washers 110 and 112 on opposite sides of tab 46' is especially effective in reducing noise and vibration during operation of the motor 12'. The configuration of the grommets is best seen in FIG. 5 wherein grommet 98 is shown by way of example in a perspective view.

Other forms of the invention than those described herein are also possible, and it is to be understood that the embodiments disclosed herein are in no way to be construed as a limitation of the invention. Numerous alterations and modifications of the disclosed structures will suggest themselves to those skilled in the art, and all such alterations and modifications which do not depart from the spirit and scope of the invention are intended to be within the scope of the appended claims.

I claim:

1. In a sewing machine, an electric motor including sheet metal end brackets with integral parallel arms each of which has a circularly shaped disc like end portion thereon, a frame extending over the motor and including slots for the disc like end portions of the bracket arms, means on the frame confining said disc like end portions in the said slots for pivotal movement about an axis extending through the disc like end portions of the bracket arms, a power transmission belt in the machine drivable by the motor, and means for moving said end brackets and thereby the motor about said axis to effect a tension adjustment in the belt.

2. The combination of claim 1 wherein the belt adjusting means includes a spring which biases the motor in one direction about said axis, and a screw which can be turned to move the motor in the opposite direction about said axis.

3. The combination of claim 2 including an integral tab on one of the end brackets spaced apart from the said axis, the spring being disposed between such tab and the frame, and the screw extending through the tab and spring into a threaded connection with the frame.

4. The combination of claim 2 wherein the spring is a compression spring.

5. The combination of claim 1 wherein the slots in the frame contain noise reducing grommets with pockets wherein the disc like end portions of the bracket arms are received.

6. The combination of claim 5 wherein the grommets are deformable rubber parts.

7. The combination of claim 1 wherein the end brackets are single piece stamped out sheet metal parts.

8. The combination of claim 1 wherein said confining means are screws with heads which overlap the slots in the frame.

9. The combination of claim 1 wherein said confining means are plates which overlap the slots in the frame.

* * * * *